United States Patent
Wu et al.

(10) Patent No.: US 11,876,276 B2
(45) Date of Patent: Jan. 16, 2024

(54) LIQUID CRYSTAL PHASE SHIFTER AND ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Jie Wu, Beijing (CN); Tienlun Ting, Beijing (CN); Ying Wang, Beijing (CN); Liang Li, Beijing (CN); Haocheng Jia, Beijing (CN); Cuiwei Tang, Beijing (CN); Qiangqiang Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 420 days.

(21) Appl. No.: 17/413,312

(22) PCT Filed: Oct. 13, 2020

(86) PCT No.: PCT/CN2020/120626
§ 371 (c)(1),
(2) Date: Jun. 11, 2021

(87) PCT Pub. No.: WO2021/073500
PCT Pub. Date: Apr. 22, 2021

(65) Prior Publication Data
US 2022/0021094 A1    Jan. 20, 2022

(30) Foreign Application Priority Data
Oct. 14, 2019   (CN) .......................... 201910972872.7

(51) Int. Cl.
*H01P 1/18* (2006.01)
*H01Q 3/36* (2006.01)
(Continued)

(52) U.S. Cl.
CPC ............ *H01P 1/184* (2013.01); *G02F 1/1313* (2013.01); *G02F 1/13439* (2013.01); *H01Q 3/36* (2013.01)

(58) Field of Classification Search
CPC .............. H01Q 3/36; H01P 1/18; H01P 1/184
(Continued)

(56) References Cited

U.S. PATENT DOCUMENTS

| 4,964,701 A | 10/1990 | Dorschner et al. |
|---|---|---|
| 2001/0017577 A1 | 8/2001 | Toko et al. |
| 2015/0380789 A1* | 12/2015 | Jakoby .................... H01P 1/184 343/905 |

FOREIGN PATENT DOCUMENTS

| CN | 203720494 U | 7/2014 |
|---|---|---|
| CN | 103975483 A | 8/2014 |

(Continued)

OTHER PUBLICATIONS

Chinese First Office Action dated Aug. 27, 2021 corresponding to application No. 201910972872.7.

*Primary Examiner* — Rakesh B Patel
(74) *Attorney, Agent, or Firm* — Nath, Goldberg & Meyer; Joshua B. Goldberg

(57) ABSTRACT

A liquid crystal phase shifter and an antenna are provided. The liquid crystal phase shifter includes first and second substrates opposite to each other, and a liquid crystal layer therebetween. The first substrate includes a first base plate and a first electrode thereon. The first electrode includes a main body structure on a side of the first base plate distal to the liquid crystal layer and at least one branch structure on
(Continued)

a side of the first base plate proximal to the liquid crystal layer. The at least one branch structure is connected to the main body structure, and is spaced apart from each other in a lengthwise direction of the main body structure. The second substrate includes a second base plate and a second electrode thereon, and orthographic projections of the second electrode and the branch structure on the first base plate at least partially overlaps each other.

20 Claims, 4 Drawing Sheets

(51) Int. Cl.
 *G02F 1/13* (2006.01)
 *G02F 1/1343* (2006.01)
(58) Field of Classification Search
 USPC .......................................... 333/161, 204, 205
 See application file for complete search history.

(56) References Cited

FOREIGN PATENT DOCUMENTS

| | | |
|---|---|---|
| CN | 108181745 A | 6/2018 |
| CN | 108615962 A | 10/2018 |
| CN | 108761862 A | 11/2018 |
| CN | 108808181 A | 11/2018 |
| CN | 208384288 U | 1/2019 |
| CN | 208654481 U | 3/2019 |
| CN | 208655852 U | 3/2019 |
| CN | 208818972 U | 5/2019 |
| CN | 110137636 A | 8/2019 |
| JP | 3874964 B2 | 1/2007 |

\* cited by examiner

LIQUID CRYSTAL PHASE SHIFTER AND ANTENNA

CROSS REFERENCE TO RELATED APPLICATIONS

This is a National Phase Application filed under 35 U.S.C. 371 as a national stage of PCT/CN2020/120626, filed Oct. 13, 2020, an application claiming the benefit of Chinese Application No. 201910972872.7, filed Oct. 14, 2019, the content of each of which is hereby incorporated by reference in its entirety.

TECHNICAL FIELD

The present disclosure relates to the field of communication technologies, and in particular to a liquid crystal phase shifter and an antenna.

BACKGROUND

A phase shifter is a device capable of adjusting (or changing) a phase of a microwave, and is widely used in electronic communication systems. Further, the phase shifter is a core component in each of a phased array radar, a synthetic aperture radar, a radar electronic countermeasure system, a satellite communication system, a transceiver, and the like. Thus, the phase shifter with a high performance will play a crucial role in each of these systems.

SUMMARY

A first aspect of the present disclosure provides a liquid crystal phase shifter, which includes: a first substrate and a second substrate opposite to each other, and a liquid crystal layer between the first substrate and the second substrate, wherein, the first substrate includes a first base plate and a first electrode on the first base plate;

the first electrode includes a main body structure on a side of the first base plate distal to the liquid crystal layer and at least one branch structure on a side of the first base plate proximal to the liquid crystal layer, the at least one branch structure is connected to the main body structure through at least one through hole penetrating through the first base plate, respectively, and is spaced apart from each other in a lengthwise direction of the main body structure; and the second substrate includes a second base plate and a second electrode on the second base plate, and an orthographic projection of the second electrode on the first base plate at least partially overlaps an orthographic projection of the at least one branch structure on the first base plate.

In some embodiments, the main body structure includes a first side and a second side opposite to each other in a direction perpendicular to the lengthwise direction, and only one of the first side and the second side of the main body structure is provided with the at least one branch structure.

In some embodiments, the main body structure includes a first side and a second side opposite to each other in a direction perpendicular to the lengthwise direction, and each of the first side and the second side of the main body structure is provided with the at least one branch structure.

In some embodiments, the at least one branch structure on the first side is in one-to-one correspondence with the at least one branch structure on the second side.

In some embodiments, the second electrode includes a plate electrode.

In some embodiments, the second electrode includes a ground electrode.

In some embodiments, the at least one branch structure on each of the first side and the second side of the main body structure includes a plurality of branch structures, and a distance between any adjacent two of the plurality of branch structures is a fixed value.

In some embodiments, a material of each of the first electrode and the second electrode includes a metal.

In some embodiments, the metal includes at least one of aluminum, silver, gold, chromium, molybdenum, nickel, and iron.

In some embodiments, the liquid crystal layer has a thickness less than or equal to 10 μm.

In some embodiments, the thickness of the liquid crystal layer is between 5 μm and 10 μm.

In some embodiments, a material of each of the first base plate and the second base plate includes a glass base plate of 100 μm to 1,000 μm, a sapphire base plate, a polyethylene terephthalate base plate of 10 μm to 500 μm, a triallyl cyanurate base plate of 10 μm to 500 μm, a transparent flexible polyimide base plate of 10 μm to 500 μm, or a high-purity quartz glass base plate.

In some embodiments, the liquid crystal layer includes positive liquid crystal molecules or negative liquid crystal molecules;

in a case where the liquid crystal layer includes the positive liquid crystal molecules, an angle between a long axis direction of each positive liquid crystal molecule and a plane where the first base plate is located is greater than 0 degrees and less than or equal to 45 degrees; and in a case where the liquid crystal layer includes the negative liquid crystal molecules, an angle between a long axis direction of each negative liquid crystal molecule and the plane where the first base plate is located is greater than 45 degrees and less than 90 degrees.

In some embodiments, a dielectric constant of each liquid crystal molecule of the liquid crystal layer in a long axis direction of the liquid crystal molecule is greater than a dielectric constant of each of the first base plate and the second base plate.

In some embodiments, each branch structure of the at least one branch structure completely covers a through hole, which corresponds to the branch structure, of the at least one through hole.

A second aspect of the present disclosure provides an antenna, which includes the liquid crystal phase shifter according to any one of the foregoing embodiments of the first aspect of the present disclosure.

DETAILED DESCRIPTION

Figure 1:
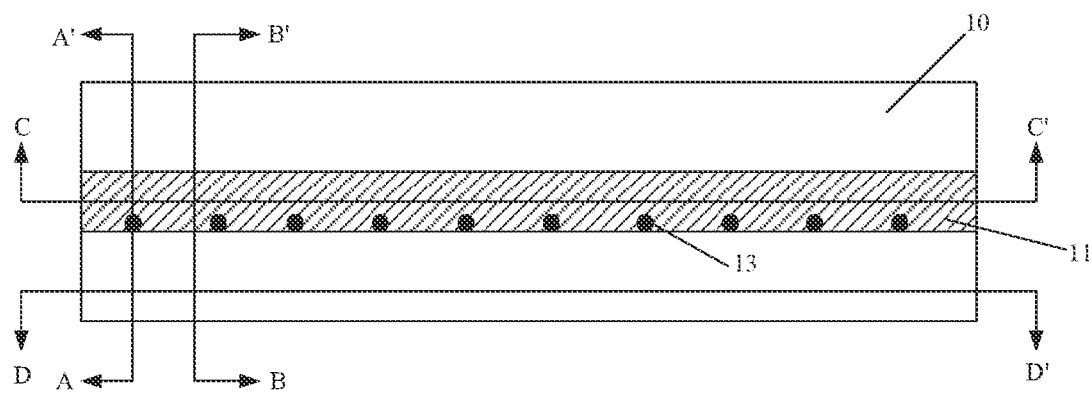
FIG. 1 is a schematic top view of a liquid crystal phase shifter according to an embodiment of the present disclosure.

To enable one of ordinary skill in the art to better understand technical solutions of the present disclosure, the present disclosure will be further described in detail below with reference to the accompanying drawings and exemplary embodiments.

Unless defined otherwise, technical or scientific terms used herein should have the same meaning as commonly understood by one of ordinary skill in the art to which the present disclosure belongs. The terms of "first", "second," and the like used in the present disclosure are not intended to indicate any order, quantity, or importance, but rather are used for distinguishing one element from another. Further, the term "a", "an", "the", or the like used herein do not denote a limitation of quantity, but rather denote the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used merely for indicating relative positional relationships, and when the absolute position of an object being described is changed, the relative positional relationships may also be changed accordingly.

The inventors of the present inventive concept have found that, a phase shifter in the related art has the disadvantages of large loss, long response time, large volume, etc., and cannot meet the requirements of the rapid development of an electronic communication system.

Specifically, most of the phase shifters currently available on the market are a ferrite phase shifter and a positive-intrinsic-negative (PIN) diode phase shifter. For example, the ferrite phase shifter has the disadvantages of a large volume and a slow response speed, and thus is not suitable for high-speed beam scanning. The PIN diode phase shifter has a high power consumption and is therefore not suitable for a lightweight and low-power-consumption phased array system.

The main idea of the present inventive concept is as follows. A liquid crystal phase shifter includes a first substrate and a second substrate disposed opposite to each other, and a liquid crystal layer between the first substrate and the second substrate. For example, the first substrate may include: a first base plate, and a first electrode on a side of the first base plate proximal to the liquid crystal layer. The second substrate may include: a second base plate, and a second electrode on a side of the second base plate proximal to the liquid crystal layer. The first electrode generally includes a main body structure, and branch structures connected to the main body structure. The second electrode is usually a plate electrode, and the plate electrode may just (or exactly) completely cover a surface of the second base plate 20 proximal to the liquid crystal layer 30 or a surface of the second base plate 20 distal to the liquid crystal layer 30. Thus, an orthographic projection of the plate-shaped second electrode on the first base plate necessarily overlaps an orthographic projection of the branch structures on the first base plate. In this case, if the second electrode serves as a ground electrode, a microwave signal may be introduced into the main body structure of the first electrode through a connector such as a tab, to be transmitted in the liquid crystal layer. Further, different voltages are applied to the branch structures (e.g., through the main body structure) such that different electric fields are generated between the branch structures and the second electrode, so as to change rotation angles of liquid crystal molecules of the liquid crystal layer, thereby changing a dielectric constant (i.e., a permittivity) of the liquid crystal layer. In this way, different phase shifting degrees of the microwave signal can be achieved.

It should be noted that, the foregoing description is made by taking an example in which the second electrode is the ground electrode, but the present disclosure is not limited thereto. For example, in practical applications, the second electrode may not be the ground electrode, and in this case, a ground electrode may be disposed on a side of the second base plate distal to the liquid crystal layer such that the first electrode and the second electrode form respective current loop with the ground electrode, respectively. In the following embodiments of the present disclosure, for convenience of description, the following description is made by taking an example in which the second electrode is the ground electrode and the first electrode is a microstrip (which may also be referred to as a microstrip line).

In a first aspect, as shown in FIGS. 1 to 10, embodiments of the present disclosure provide a liquid crystal phase shifter. The liquid crystal phase shifter includes: a first substrate and a second substrate disposed opposite to each other, and a liquid crystal layer 30 between the first substrate and the second substrate. For example, the first substrate may include: a first base plate 10, and a first electrode 1 disposed on the first base plate 10. The second substrate may include: a second base plate 20, and a second electrode 2 disposed on a side of the second base plate 20 proximal to the liquid crystal layer 30. In an example, the first electrode 1 includes: a main body structure 11 located on a side of the first base plate 10 distal to the liquid crystal layer 30, and at least one branch structure 12 located on a side of the first base plate 10 proximal to the liquid crystal layer 30. The at least one branch structure 12 is connected to the main body structure 11 through at least one through hole 13 (e.g., the positions of the black dots shown in FIG. 1 are through holes 13, and the through holes 13 may be in one-to-one correspondence with branch structures 12) penetrating through the first base plate 10, and is paced apart from each other in a lengthwise direction of the main body structure. Further, an orthographic projection of each branch structure 12 on the first base plate 10 (or the second base plate 20) at least partially overlaps an orthographic projection of the second electrode 2 on the first base plate 10 (or the second base plate 20). Thus, a voltage may be applied to the at least one branch structure 12 through the main body structure 11, such that an electric field is formed between the at least one branch structure 12 and the second electrode 2, thereby rotating the liquid crystal molecules of the liquid crystal layer 30 to change a dielectric constant of the liquid crystal layer 30, and changing a phase of a microwave signal transmitted in the liquid crystal layer 30. In the present embodiment, since the at least one branch structure 12 of the first electrode 1 is disposed on the side of the first base plate 10 proximal to the liquid crystal layer 30, a transmission medium for the microwave signal mainly includes the liquid crystal molecules, thereby reducing a transmission loss of the microwave signal, i.e., reducing an insertion loss of the liquid crystal phase shifter.

Figure 2:
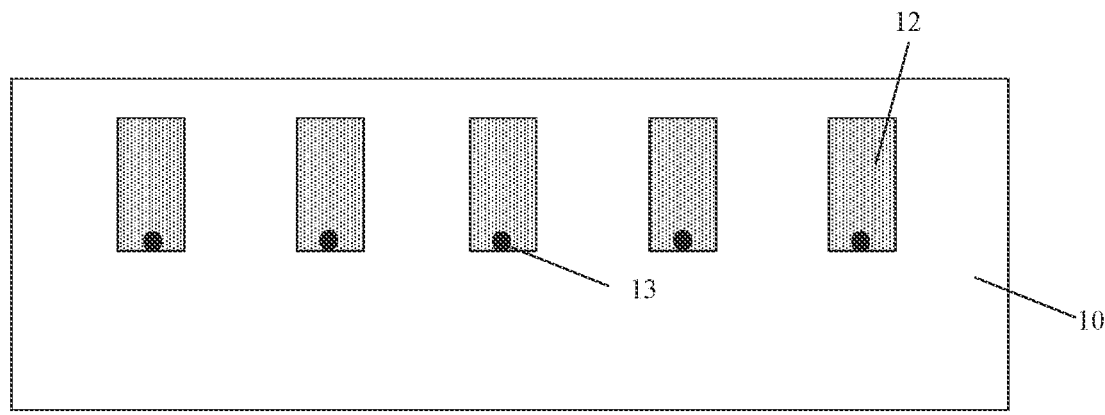
FIG. 2 is a schematic plan view of a side, which is proximal to a liquid crystal layer, of a first substrate of the liquid crystal phase shifter shown in FIG. 1.

It should be understood that although FIGS. 1 and 2 show an embodiment in which the first electrode 1 includes a plurality of branch structures 12, the first electrode 1 may include only one branch structure 12. In the case where the first electrode 1 includes the plurality of branch structures 12, a more uniform electric field may be formed between the plurality of branch structures 12 and the second electrode 2, thereby making the dielectric constant of the liquid crystal layer 30 more uniform. In an embodiment, the main body structure 11 of the first electrode 1 may have a strip (or ribbon) shape, and may have a length equal to a length (i.e., a dimension in the horizontal direction of FIG. 1) of the first base plate 10. In addition, the main body structure 11 of the first electrode 1 may have a width less than a width (i.e., a dimension in the vertical direction of FIG. 1) of the first base plate 10, and may be located in a central portion of the surface of the first base plate 10 distal to the liquid crystal layer 30. For example, the length of the main body structure 11 of the first electrode 1 may be equal to a length of the second electrode 2, and the width of the main body structure 11 of the first electrode 1 may be less than a width of the second electrode 2.

In some embodiments, each branch structure 12 completely covers the through hole 13 corresponding to the branch structure 12, thereby preventing a material of the liquid crystal layer 30 from leaking out.

Figure 3:
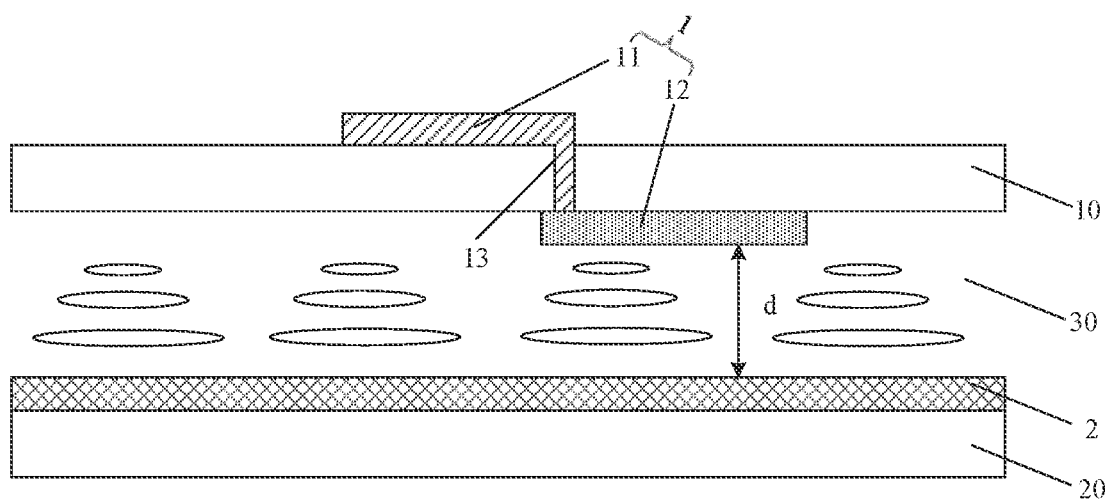
FIG. 3 is a schematic cross-sectional view of the liquid crystal phase shifter shown in FIG. 1 taken along a line A-A'.
Figure 4:
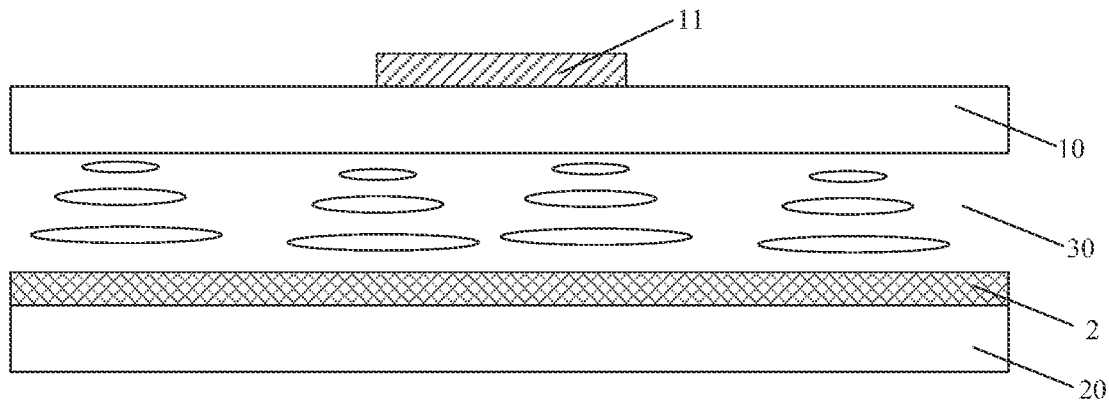
FIG. 4 is a schematic cross-sectional view of the liquid crystal phase shifter shown in FIG. 1 taken along a line B-B'.
Figure 5:
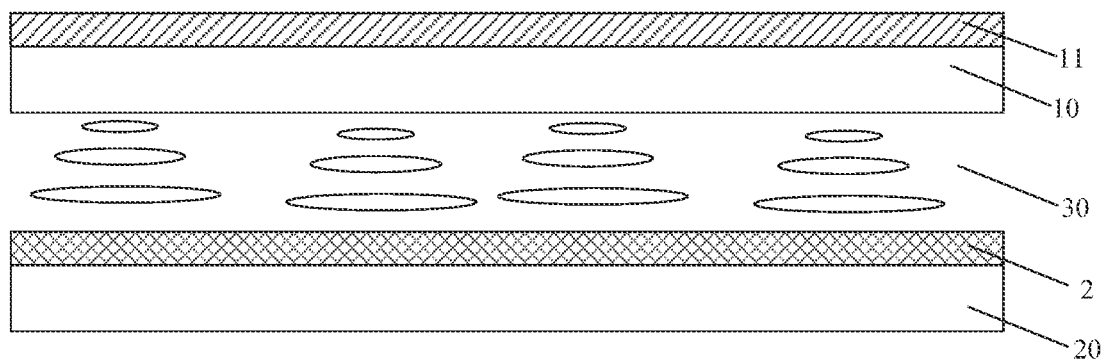
FIG. 5 is a schematic cross-sectional view of the liquid crystal phase shifter shown in FIG. 1 taken along a line C-C'.
Figure 6:
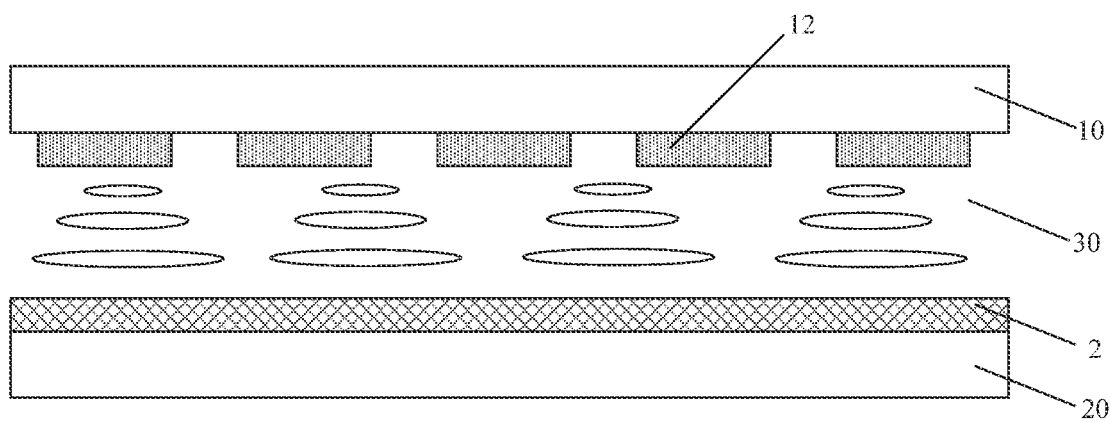
FIG. 6 is a schematic cross-sectional view of the liquid crystal phase shifter shown in FIG. 1 taken along a line D-D'.
Figure 7:
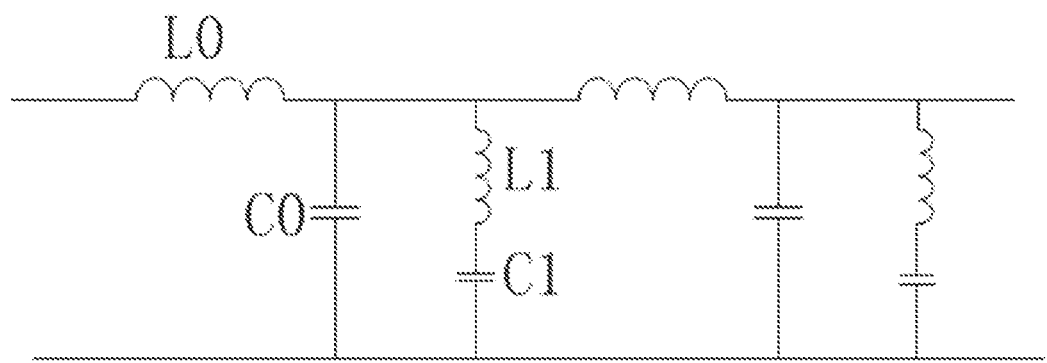
FIG. 7 is an equivalent circuit diagram of the liquid crystal phase shifter shown in FIG. 1.

In some embodiments of the present disclosure, as shown in FIGS. 1 to 6, the main body structure 11 includes: a lengthwise direction (e.g., the horizontal direction in FIG. 1), a first side (e.g., a lower side of the main body structure 11 in FIG. 1 or 8) and a second side (e.g., an upper side of the main body structure 11 in FIG. 1 or 8) that are disposed opposite to each other in a direction (e.g., the vertical direction in FIG. 1) perpendicular to the lengthwise direction, and a plurality of branch structures 12 that are connected to only one of the first side and the second side of the main body structure 11. FIG. 7 is an equivalent circuit diagram of the liquid crystal phase shifter shown in FIG. 1. As shown in FIG. 7, reference signs $L_0$ and $C_0$ denote an inductance per unit length and a capacitance per unit length of the first electrode 1, reference sign $L_1$ denotes an inductance introduced by each through hole 13, and reference sign $C_1$ denotes a capacitance (which may be simply referred to as "overlap capacitance") formed by the overlapping of the second electrode 2 and each branch structure 12 proximal to the liquid crystal layer 30. FIG. 7 shows two branches each of which is formed by connecting the inductance $L_1$ and the overlap capacitance $C_1$ to each other in series. The remaining one capacitance shown in FIG. 7, except for the capacitance $C_0$ and the two overlap capacitances $C_1$, may be a parasitic capacitance. A magnitude of each overlap capacitance $C_1$ may be calculated by using the following formula:

$$C_1 = \frac{\varepsilon_0 \varepsilon_r S}{d},$$

where S is an overlapping area of the orthographic projection of each branch structure 12 on the first base plate 10 and the orthographic projection of the second electrode 2 on the first base plate 10, d is a thickness of the liquid crystal layer 30 (e.g., a dimension of the liquid crystal layer 30 between any one branch structure 12 and the second electrode 2, as shown in FIG. 3), $\varepsilon_0$ is a vacuum dielectric constant, and $\varepsilon_r$ is a relative dielectric constant of the liquid crystal molecules. By adjusting a driving voltage across the main body structure 11 (i.e., each branch structure 12) and the second electrode 2, the dielectric constant of the liquid crystal layer 30 can be changed, thereby changing the magnitude of each overlap capacitance $C_1$. A phase velocity Vp of the microwave signal is:

$$p = \frac{1}{\sqrt{L_0\left(C_0 + \frac{1}{1 - w^2 L_1 C_1}\right)}},$$

where w is an angular frequency of the microwave signal. According to the above formula, the phase velocity of the microwave signal is different under different voltages. Therefore, the phase of the microwave signal can be changed under a same length of a transmission line, and thereby achieving the purpose of shifting (i.e., changing) the phase of the microwave signal.

Figure 8:
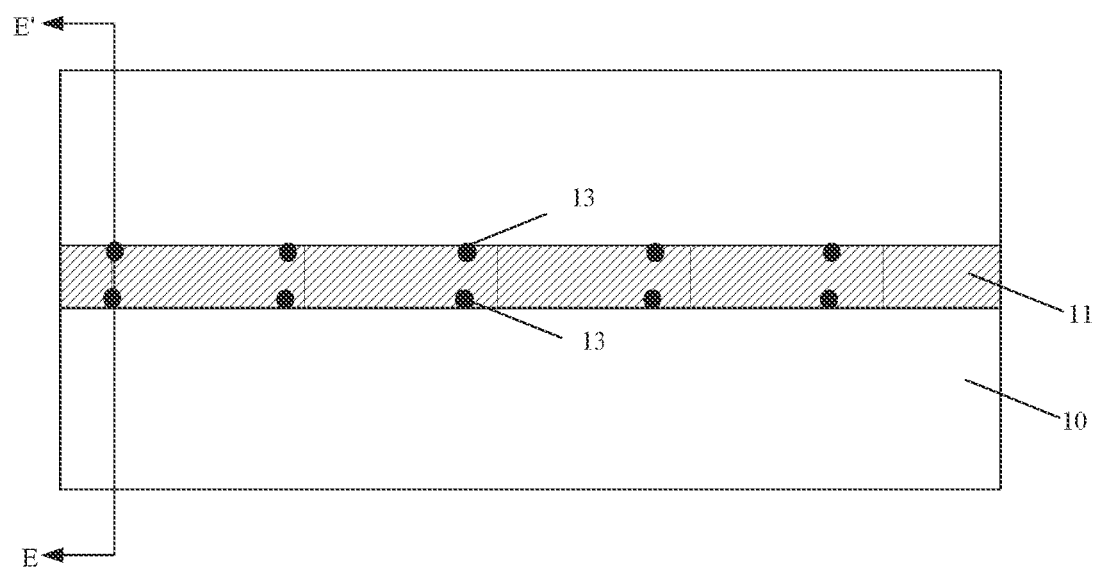
FIG. 8 is a schematic top view of another liquid crystal phase shifter according to an embodiment of the present disclosure.
Figure 9:
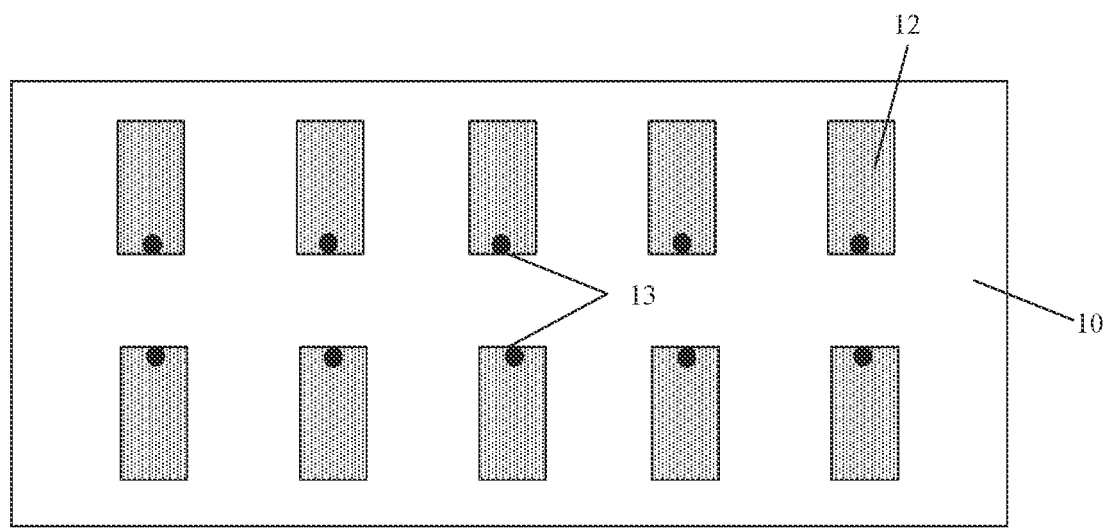
FIG. 9 is a schematic plan view of a side, which is proximal to a liquid crystal layer, of a first substrate of the liquid crystal phase shifter shown in FIG. 8.
Figure 10:
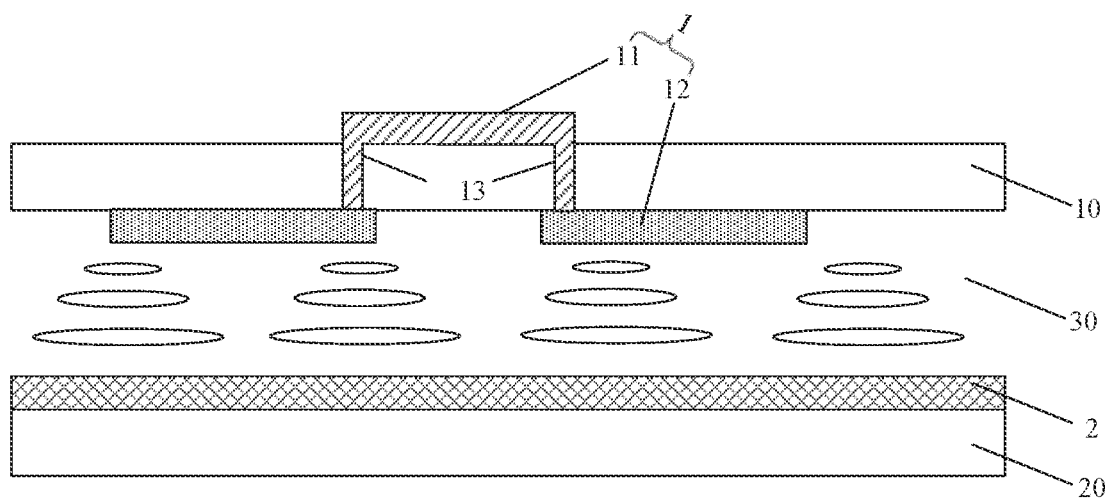
FIG. 10 is a schematic cross-sectional view of the liquid crystal phase shifter shown in FIG. 9 taken along a line E-E'.

In some embodiments of the present disclosure, as shown in FIGS. 8 to 10, the main body structure 11 may include: the lengthwise direction (e.g., the horizontal direction in FIG. 8), the first and second sides disposed opposite to each other in the direction (e.g., the vertical direction in FIG. 8) perpendicular to the lengthwise direction, and at least one branch structure (e.g., a plurality of branch structures) 12 connected to each of the first and second sides of the main body structure 11. Each branch structure 12 connected to each of both sides of the main body structure 11 has the same operation principle as each branch structure 12 connected to one of the both sides, and therefore detailed description thereof is omitted here. For example, the plurality of branch structures 12 connected to the first side of the main body structure 11 may be in one-to-one correspondence with the plurality of branch structures 12 connected to the second side of the main body structure 11, and may be respectively aligned with the plurality of branch structures 12 connected to the second side of the main body structure 11 in the direction (e.g., the vertical direction in FIGS. 8 and 9) perpendicular to the lengthwise direction, such that a structure of the liquid crystal phase shifter is simple and a manufacturing process for the liquid crystal phase shifter is convenient. However, the present disclosure is not limited thereto.

In some embodiments of the present disclosure, the plurality of branch structures 12 connected to the first side of the main body structure 11 are spaced apart from each other in the lengthwise direction of the main body structure 11, and the plurality of branch structures 12 connected to the second side of the main body structure 11 are spaced apart from each other in the lengthwise direction of the main body structure 11. A distance between any adjacent two of the branch structures 12 connected to a same side of the main body structure 11 is a fixed value (i.e., a distance between one pair of adjacent two of the branch structures 12 connected to a same side of the main body structure 11 is equal to a distance between another pair of adjacent two of the branch structures 12 connected to the same side of the main body structure 11). In this way, the dielectric constant of the liquid crystal layer 30 can be changed uniformly after a voltage is applied to the branch structures 12, which facilitates shifting of the phase of the microwave signal and reducing the difficulty in manufacturing the liquid crystal phase shifter. Alternatively, the branch structures 12 connected to a same side of the main body structure 11 may be arranged according to a predetermined arrangement period.

In some embodiments of the present disclosure, each of the first base plate 10 and the second base plate 20 may be a glass base plate having a thickness of 100 µm to 1,000 µm, or may be a sapphire base plate having a thickness of 100 µm to 1,000 µm, or may be one of a polyethylene terephthalate base plate, a triallyl cyanurate base plate, and a transparent flexible polyimide base plate each of which has a thickness of 10 µm to 500 µm. As such, a loss of a microwave transmitted by the liquid crystal phase shifter is effectively reduced, and the liquid crystal phase shifter has a low power consumption and a high signal-to-noise ratio.

Alternatively, each of the first base plate 10 and the second base plate 20 may include high-purity quartz glass having extremely low dielectric loss. For example, the high-purity quartz glass may refer to quartz glass in which a weight percentage of $SiO_2$ is greater than or equal to 99.9%. Compared with a general glass base plate, the first base plate 10 and/or the second base plate 20 including the high-purity quartz glass can further effectively reduce the loss of the microwave transmitted by the liquid crystal phase shifter, such that the liquid crystal phase shifter has a lower power consumption and a higher signal-to-noise ratio.

In some embodiments of the present disclosure, a material of the first electrode 1 may include a metal, and for example, the metal may be aluminum, silver, gold, chromium, molybdenum, nickel, and/or iron.

In some embodiments of the present disclosure, a material of the second electrode 2 may include a metal, and for example, the metal may be aluminum, silver, gold, chromium, molybdenum, nickel, and/or iron. Alternatively, the second electrode 2 may be made of a transparent conductive oxide such as indium tin oxide (ITO).

In some embodiments of the present disclosure, the liquid crystal molecules of the liquid crystal layer 30 are positive liquid crystal molecules or negative liquid crystal molecules. It should be noted that, in a case where the liquid crystal molecules are positive liquid crystal molecules, an angle between a long axis direction of each liquid crystal molecule and a plane where the second electrode 2 (or the first base plate 10 or the second base plate 20) is located in the embodiments of the present disclosure is greater than 0° and is less than or equal to 45°. In a case where the liquid crystal molecules are negative liquid crystal molecules, the angle between the long axis direction of each liquid crystal molecule and the plane where the second electrode 2 (or the first base plate 10 or the second base plate 20) is located is greater than 45° and less than 90°. As such, it is ensured that the dielectric constant of the liquid crystal layer 30 can be better adjusted after the liquid crystal molecules are rotated, thereby achieving the purpose of shifting (i.e., changing) the phase of the microwave signals.

In some embodiments of the present disclosure, in order to better adjust the dielectric constant of the liquid crystal layer 30 after the liquid crystal molecules of the liquid crystal layer 30 are rotated, the dielectric constant of each liquid crystal molecule of the liquid crystal layer 30 in the long axis direction of the liquid crystal molecule may be greater than a dielectric constant of each of the first base plate 10 and the second base plate 20. For example, a material of the liquid crystal layer 30 may be selected according to the requirement of practical production and the cost for the material.

In some embodiments of the present disclosure, the thickness of the liquid crystal layer 30 is not greater than 10 µm, and for example, the thickness of the liquid crystal layer 30 includes, but is not limited to, being in a range of 5 µm to 10 µm, to ensure that a response time of the liquid crystal layer 30 is short enough.

In a second aspect, an embodiment of the present disclosure provides an antenna, which includes the liquid crystal phase shifter according to any one of the foregoing embodiments. In a practical application, the antenna may further include a carrier unit such as a carrier plate, and the liquid crystal phase shifter may be disposed on the carrier plate, which is not limited in an embodiment of the present disclosure.

It should be noted that the number of the liquid crystal phase shifters included in the antenna may be determined according to the practical requirements, which is not limited in an embodiment of the present disclosure. In other words, the antenna provided by the present disclosure may include one or more liquid crystal phase shifters provided by the present disclosure.

It should be understood that the foregoing embodiments are merely exemplary embodiments adopted to explain the principles of the present disclosure, and the present disclosure is not limited thereto. It will be apparent to one of ordinary skill in the art that various changes and modifications may be made therein without departing from the scope of the present disclosure as defined in the appended claims, and such changes and modifications also fall within the scope of the present disclosure.

What is claimed is:

1. A liquid crystal phase shifter, comprising: a first substrate and a second substrate opposite to each other, and a liquid crystal layer between the first substrate and the second substrate, wherein,
    the first substrate comprises a first base plate and a first electrode on the first base plate;
    the first electrode comprises a main body structure on a side of the first base plate distal to the liquid crystal layer and at least one branch structure on a side of the first base plate proximal to the liquid crystal layer, the at least one branch structure is connected to the main body structure through at least one through hole penetrating through the first base plate, respectively, and is spaced apart from each other in a lengthwise direction of the main body structure; and
    the second substrate comprises a second base plate and a second electrode on the second base plate, and an orthographic projection of the second electrode on the first base plate at least partially overlaps an orthographic projection of the at least one branch structure on the first base plate.

2. The liquid crystal phase shifter according to claim 1, wherein a dielectric constant of each liquid crystal molecule of the liquid crystal layer in a long axis direction of the liquid crystal molecule is greater than a dielectric constant of each of the first base plate and the second base plate.

3. The liquid crystal phase shifter according to claim 1, wherein each branch structure of the at least one branch structure completely covers a through hole, which corresponds to the branch structure, of the at least one through hole.

4. An antenna, comprising the liquid crystal phase shifter according to claim 1.

5. The liquid crystal phase shifter according to claim 1, wherein the second electrode comprises a plate electrode.

6. The liquid crystal phase shifter according tog claim 1, wherein the second electrode comprises a ground electrode.

7. The liquid crystal phase shifter according to claim 1, wherein the at least one branch structure on each of the first side and the second side of the main body structure comprises a plurality of branch structures, and a distance between any adjacent two of the plurality of branch structures is a fixed value.

8. The liquid crystal phase shifter according to claim 1, wherein a material of each of the first electrode and the second electrode comprises a metal.

9. The liquid crystal phase shifter according to claim 8, wherein the metal comprises at least one of aluminum, silver, gold, chromium, molybdenum, nickel, and iron.

10. The liquid crystal phase shifter according to claim 1, wherein the liquid crystal layer has a thickness less than or equal to 10 μm.

11. The liquid crystal phase shifter according to claim 10, wherein the thickness of the liquid crystal layer is between 5 μm and 10 μm.

12. The liquid crystal phase shifter according to claim 1, wherein each of the first base plate and the second base plate comprises a glass base plate of 100 μm to 1,000 μm, a sapphire base plate, a polyethylene terephthalate base plate of 10 μm to 500 μm, a triallyl cyanurate base plate of 10 μm to 500 μm, a transparent flexible polyimide base plate of 10 μm to 500 μm, or a high-purity quartz glass base plate.

13. The liquid crystal phase shifter according to claim 1, wherein the liquid crystal layer comprises positive liquid crystal molecules or negative liquid crystal molecules;
   in a case where the liquid crystal layer comprises the positive liquid crystal molecules, an angle between a long axis direction of each positive liquid crystal molecule and a plane where the first base plate is located is greater than 0 degrees and less than or equal to 45 degrees; and
   in a case where the liquid crystal layer comprises the negative liquid crystal molecules, an angle between a long axis direction of each negative liquid crystal molecule and the plane where the first base plate is located is greater than 45 degrees and less than 90 degrees.

14. The liquid crystal phase shifter according to claim 1, wherein the main body structure comprises a first side and a second side opposite to each other in a direction perpendicular to the lengthwise direction, and only one of the first side and the second side of the main body structure is provided with the at least one branch structure.

15. The liquid crystal phase shifter according to claim 14, wherein the at least one branch structure on each of the first side and the second side of the main body structure comprises a plurality of branch structures, and a distance between any adjacent two of the plurality of branch structures is a fixed value.

16. The liquid crystal phase shifter according to claim 14, wherein a dielectric constant of each liquid crystal molecule of the liquid crystal layer in a long axis direction of the liquid crystal molecule is greater than a dielectric constant of each of the first base plate and the second base plate.

17. The liquid crystal phase shifter according to claim 1, wherein the main body structure comprises a first side and a second side opposite to each other in a direction perpendicular to the lengthwise direction, and each of the first side and the second side of the main body structure is provided with the at least one branch structure.

18. The liquid crystal phase shifter according to claim 17, wherein the at least one branch structure on each of the first side and the second side of the main body structure comprises a plurality of branch structures, and a distance between any adjacent two of the plurality of branch structures is a fixed value.

19. The liquid crystal phase shifter according to claim 17, wherein the at least one branch structure on the first side is in one-to-one correspondence with the at least one branch structure on the second side.

20. The liquid crystal phase shifter according to claim 17, wherein a dielectric constant of each liquid crystal molecule of the liquid crystal layer in a long axis direction of the liquid crystal molecule is greater than a dielectric constant of each of the first base plate and the second base plate.

* * * * *